(12) United States Patent
Osborn

(10) Patent No.: US 7,086,661 B1
(45) Date of Patent: Aug. 8, 2006

(54) RETRACTABLE CURTAIN FOR TOWING VEHICLES

(76) Inventor: Charles Osborn, 18655 N. Palomar Dr., Sun City West, AZ (US) 85375

( * ) Notice: Subject to any disclaimer, the term of this patent is extended or adjusted under 35 U.S.C. 154(b) by 0 days.

(21) Appl. No.: 10/977,217

(22) Filed: Oct. 28, 2004

Related U.S. Application Data

(60) Provisional application No. 60/570,684, filed on May 11, 2004.

(51) Int. Cl.
*B60R 9/00* (2006.01)

(52) U.S. Cl. ............... 280/507; 150/166; 280/770
(58) Field of Classification Search ........... 280/480, 280/481.1, 507, 770, 848, 762, 760; 150/166; 296/136.1, 143; 135/903, 904
See application file for complete search history.

(56) References Cited

U.S. PATENT DOCUMENTS

| 2,097,923 | A | * | 11/1937 | Hutchinson | ............ | 135/88.08 |
|---|---|---|---|---|---|---|
| 5,171,056 | A | * | 12/1992 | Faludy et al. | ............ | 296/163 |
| 5,829,775 | A | * | 11/1998 | Maxwell et al. | ............ | 280/507 |
| 6,022,038 | A | * | 2/2000 | Maxwell et al. | ............ | 280/507 |
| 6,196,587 | B1 | | 3/2001 | Sage | | |
| 6,276,381 | B1 | * | 8/2001 | O'Brien | ............ | 135/87 |
| 6,702,344 | B1 | * | 3/2004 | Belli | ............ | 293/128 |
| 2002/0084643 | A1 | * | 7/2002 | Trampe | ............ | 280/770 |

FOREIGN PATENT DOCUMENTS

CH          637068        *  7/1983

\* cited by examiner

*Primary Examiner*—Anne Marie Boehler
(74) *Attorney, Agent, or Firm*—Gregory J. Nelson

(57) ABSTRACT

A protective towing shield or curtain attachable to the rear of a towing vehicle. The towing shield has a flexible mesh panel which is coupled to a retractor. When in use, the panel is deployed and attached to the front of the towed vehicle. The deployed curtain extends horizontally between the vehicles to downwardly direct and deflect road debris, rock, gravel, salt and the like. The curtain is readily attached and detached to the towed vehicle at fasteners such as by detent pins engageable in eye bolts. A turn support strut is attached when the curtain is deployed. The curtain, including the strut and fasteners, may be stored on the retractor when not in use.

19 Claims, 5 Drawing Sheets

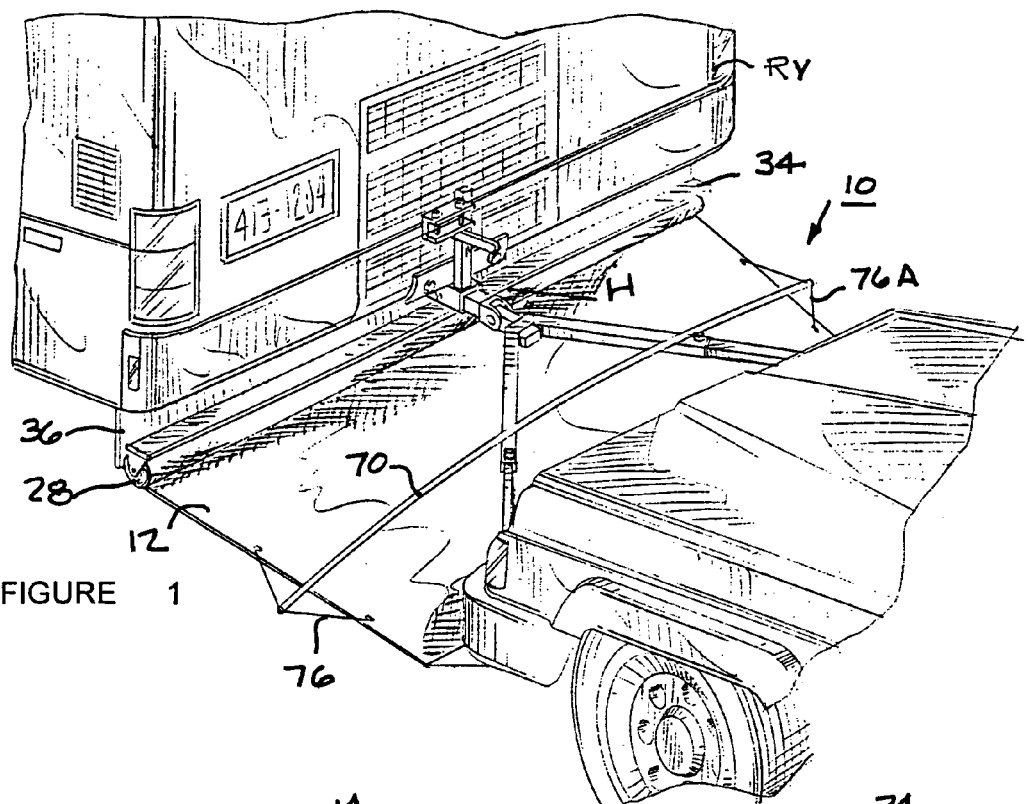
FIGURE 1
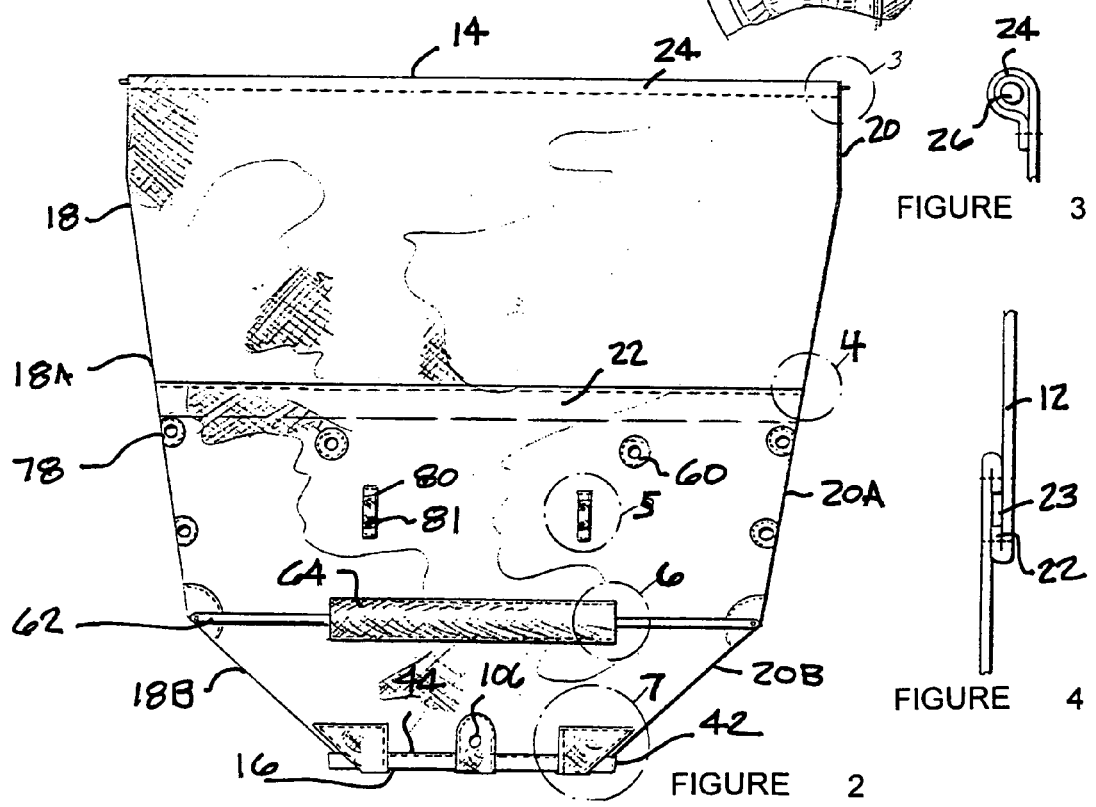
FIGURE 2
FIGURE 3
FIGURE 4

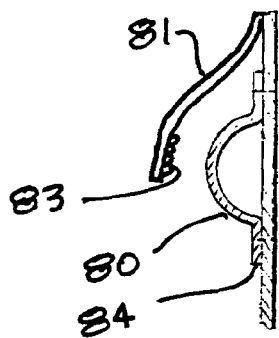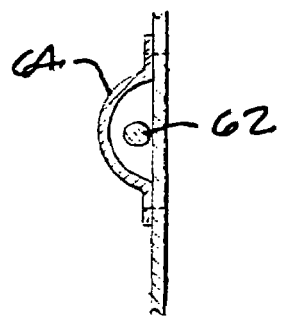
FIGURE 5  FIGURE 6  FIGURE 7
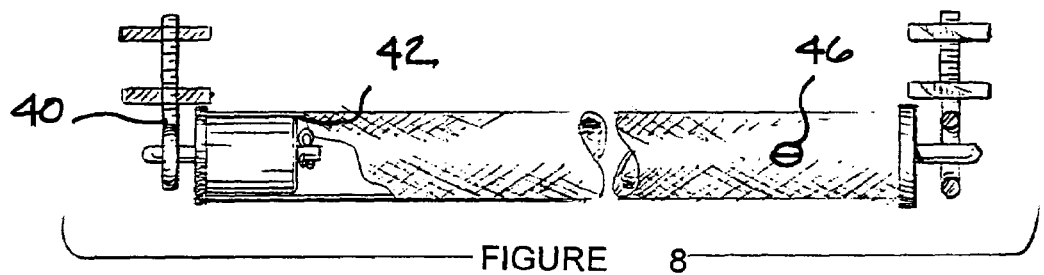
FIGURE 8
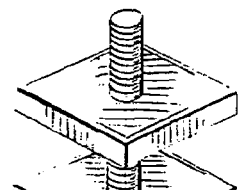
FIGURE 9
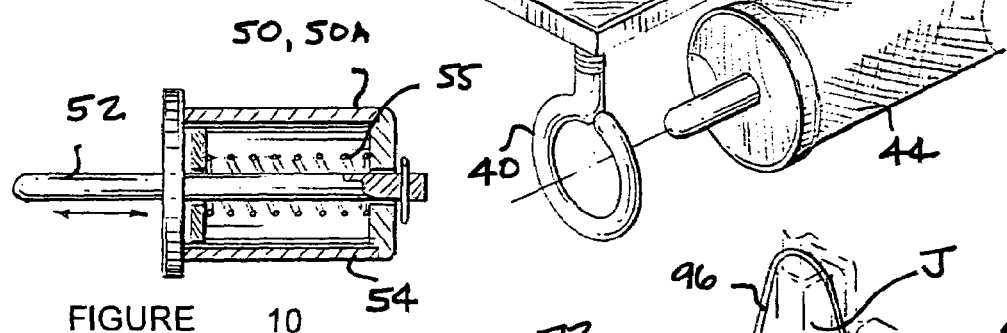
FIGURE 10
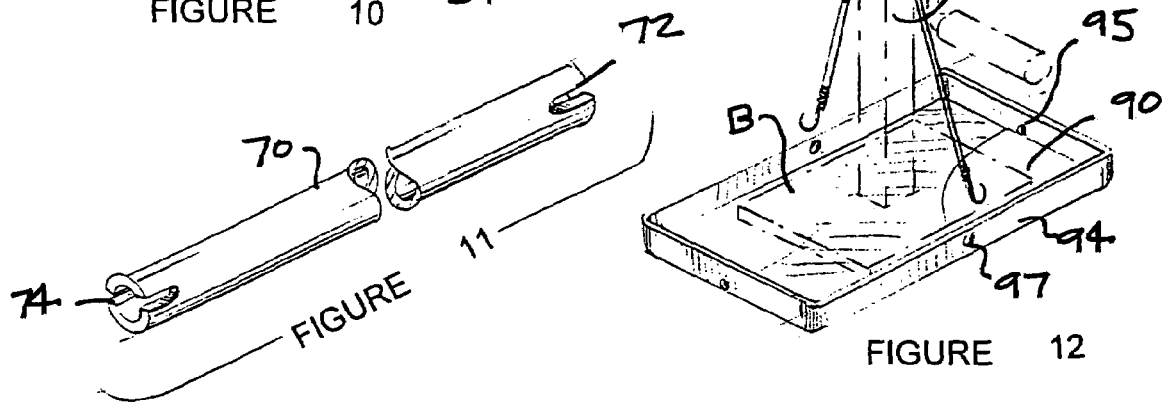
FIGURE 11
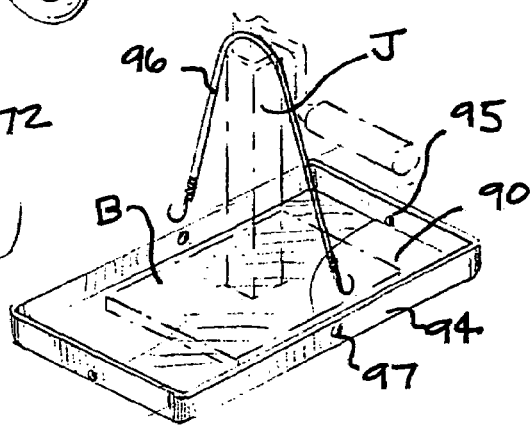
FIGURE 12

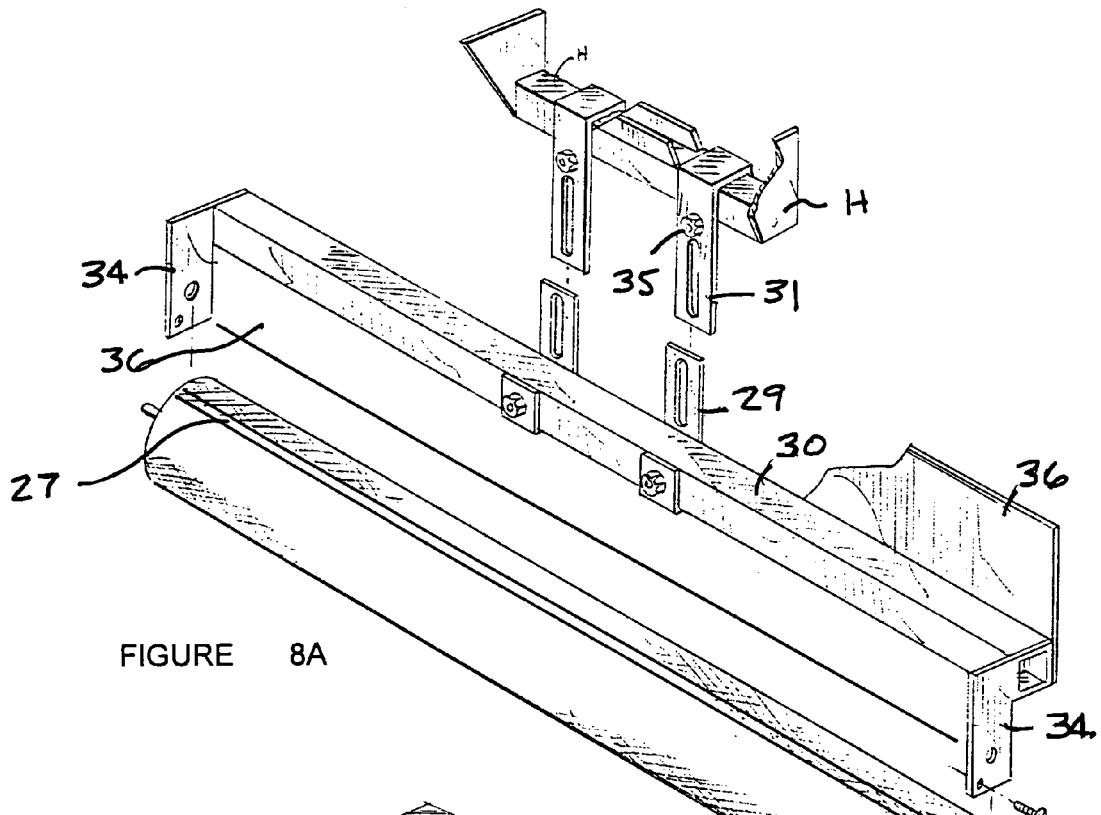
FIGURE 8A
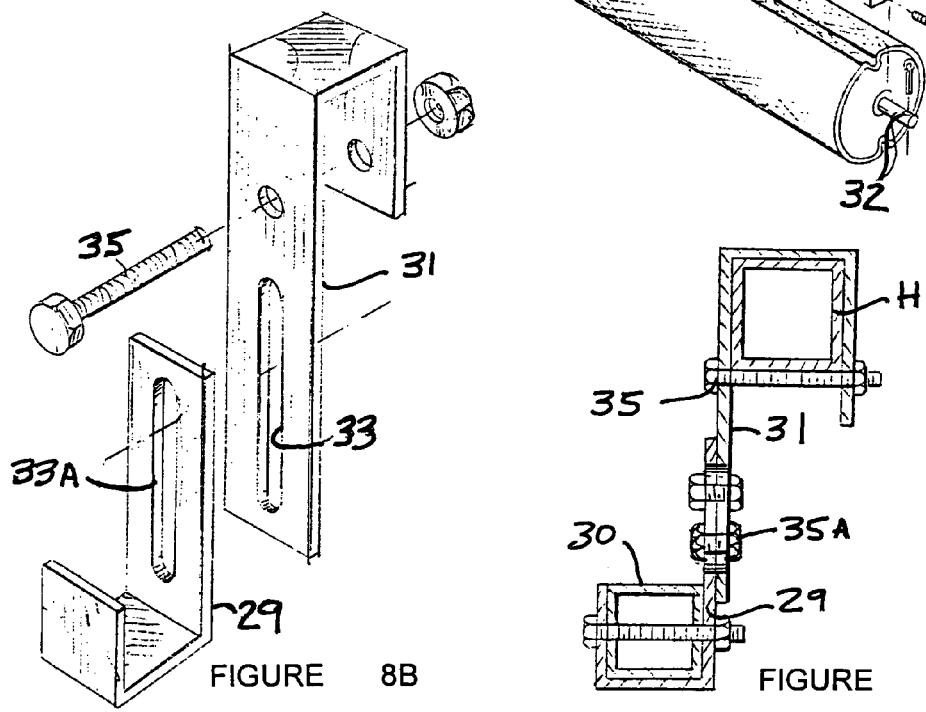
FIGURE 8B
FIGURE 8C

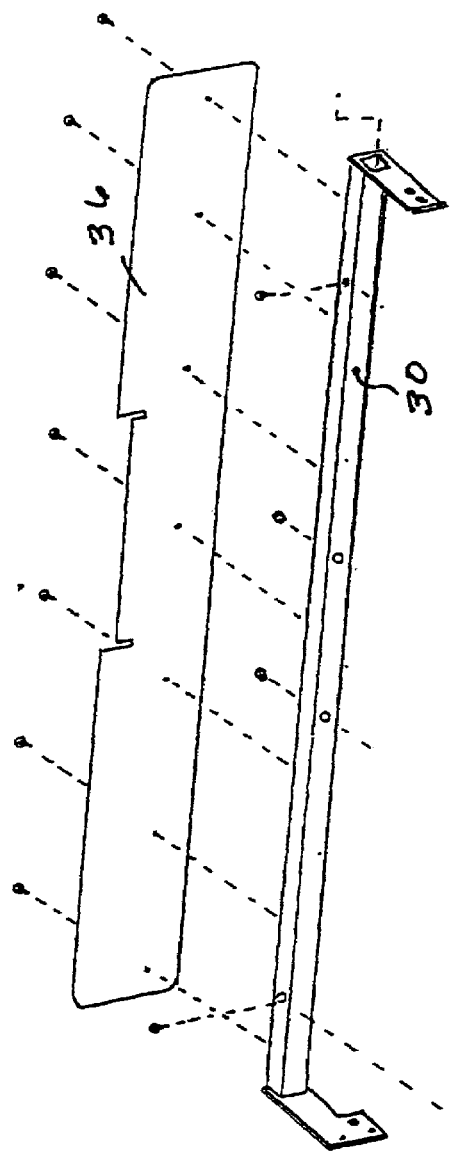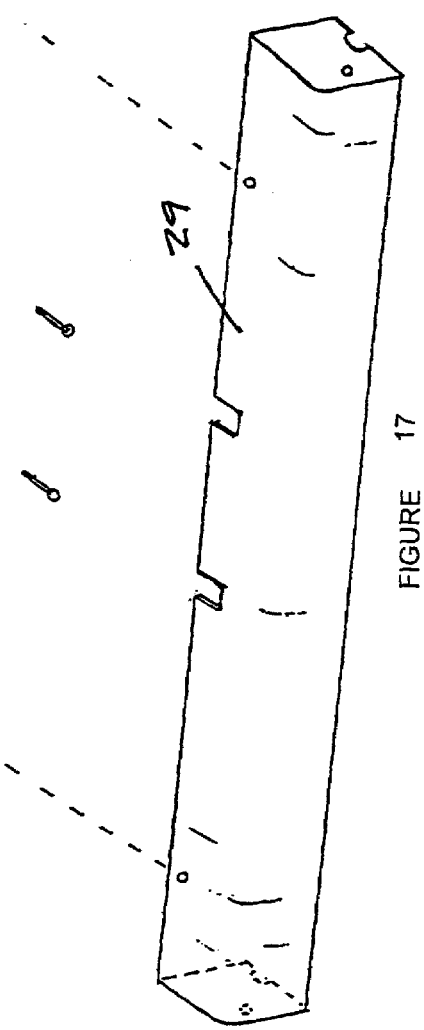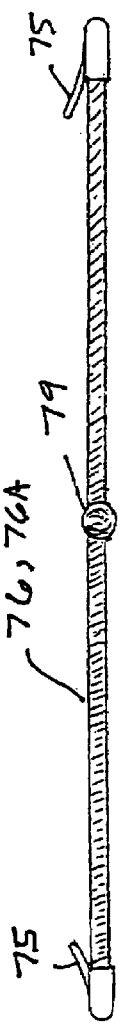

RETRACTABLE CURTAIN FOR TOWING VEHICLES

CROSS-REFERENCE IS MADE TO RELATED APPLICATION

This application is based on provisional application Ser. No. 60/570,684, filed May 11, 2004, of the same title.

FIELD OF THE INVENTION

The present invention relates to a towing device and more particularly relates to a retractable tow curtain for shielding and protecting both the towed vehicle and the towing vehicle from deflected road debris, rocks, moisture, gravel and other material that may, in the course of travel, damage or adhere to the vehicles' surfaces.

BACKGROUND OF THE INVENTION

It is common practice to tow a vehicle such as a car or trailer behind a larger vehicle such as a recreational vehicle (RV). In the course of towing, material and debris such as gravel, rocks, mud, snow, water, road accumulations of oil and grease are directed rearwardly and upwardly from the rear of the towing vehicle and will accumulate on the surface of both the towing and towed vehicle. The deflected materials often adhere to vehicle surfaces and, more seriously, flying debris can cause damage to the vehicle glass and paint. These materials may also obstruct accessories such as the lens of rearview video cameras of the type often mounted on towing vehicles. As a result, various measures are often taken by owners and operators to deflect material so it does not strike the vehicle surfaces.

Many towing vehicles, such as RVs, will have arrangements, such as flaps or hula skirts, depending from the rear of the vehicle behind the rear wheels of the towing vehicle which are intended to deflect material downwardly toward to the road surface. Other types of shields or deflectors have been developed including rigid deflectors which are positioned between the towing and towed vehicle. Bibs or bras are also used for this purpose, but require installation and tend to rub and abrade the vehicle surface causing damage over prolonged use.

Another type of tow shield is shown in U.S. Pat. No. 6,196,587 which includes a deflecting member and means for attaching and supporting the deflecting member to the rear of the towing vehicle. The deflecting member comprises a flexible sheet which is secured by elastic members to protect the vehicle in tow from flying debris and road grime.

Notwithstanding the various devices such as those described above, there nevertheless exists the need for an improved tow curtain for protecting both towed and towing vehicles.

BRIEF SUMMARY OF THE INVENTION

Briefly, the present invention provides a vehicle tow curtain extending horizontally between the vehicles which shields both the towed and towing vehicle. The curtain is a durable, flexible mesh fabric material which extends the width of the towing vehicle and may be rearwardly tapered. The front edge of the curtain is connected to a spring-loaded retractor within a cylindrical housing. This allows the curtain to be placed in use by extending it against the spring force of the retractor. The retractor has a spring-biased roller mounted to a tubular bracket on the towing vehicle extending transversely across the rear of the vehicle preferably below an air dam. The fabric curtain is reinforced and at its rear end is provided with attachment means for securement to the front of the towed vehicle such as an automobile or trailer. The rigid reinforcing member, such as aluminum tubing, may extend transversely of the curtain in sewn-in sleeves. The attachment means, in a preferred embodiment, comprise spring-loaded detents which are engageable in eye bolts permanently secured to the front of the towed vehicle beneath the front bumper or to a suitable location on the frame.

Once the towed vehicle is connected to the towing vehicle by a hitch arrangement, the curtain can be rearwardly extended and secured to the towed vehicle. Since the curtain is a fabric material, a support strut, which is stored in a sleeve in the curtain, can be removed and attached to opposite edges of the curtain at an intermediate location by elastic members such as bungee cords to provide stability.

In the event the towed vehicle is a trailer of the type customarily having a jack depending from the hitch, an enlarged bearing pan may be secured to the underside of the base of the jack by attachment means such as a bungee cord. The large pan covers the screw jack foot or base providing a larger area so that wear of the curtain due to friction and rubbing is reduced.

Accordingly, the retractable tow curtain of the present invention is convenient and easy to store and deploy. The device is light weight and durable and separate storage is not required as the device will retract into a stored position in the retractor at the rear of the towing vehicle. The device will protect both the front of the towed vehicle and the rear of the towing vehicle and will also protect accessories such as the rear facing camera lens of a rear view video system. The device can be used with various types of towing and towed vehicles and will substantially reduce accumulated debris on the vehicles, as well as preventing or minimizing damages to the vehicle bodies, paint and glass. Also, the curtain will reduce dirt and debris that may otherwise directed to the rear engine compartment of an RV and to the radiator of a towed automotive vehicle.

BRIEF DESCRIPTION OF THE DRAWINGS

The above and other advantages and objects of the present invention will become more apparent from the following description, claims and drawings in which:

FIG. 1 is a perspective view showing the tow curtain of the present invention extending between the rear of a towing vehicle and the front of a towed vehicle;

FIG. 2 is a plan view of the tow curtain;

FIG. 3 is a detail view of an intermediate section of the curtain as indicated by the numeral 3 in FIG. 2;

FIG. 4 is a detail view indicated by the numeral 4 in FIG. 2;

FIG. 5 is a detail sectional view indicated by the numeral 5 in FIG. 2;

FIG. 6 is a detail sectional view indicated by the numeral 6 in FIG. 2;

FIG. 7 is a detail sectional view indicated by the numeral 7 in FIG. 2;

FIG. 8 shows the detent attachment of the curtain to the front of the towed vehicle;

FIG. 8A shows the details of the retractor roller and bracket;

FIG. 8B is a detail view of the mounting bracket assembly extending between a hitch component on the towing vehicle and the tubular bracket shown in FIG. 8A;

FIG. 8C is a cross-sectional view of the bracket assembly of FIG. 8B;

FIGS. 9 and 10 are detail views of the detent attachment of FIG. 8;

FIG. 11 is a perspective view of the turning strut;

FIG. 12 shows an optional bearing pan that may be used with hitch assemblies having a screw jack;

FIG. 17 is an exploded view showing an optional protective cover; and

FIG. 18 is a detail view of the attachment cords for the turn support struts.

DETAILED DESCRIPTION OF THE DRAWINGS

Figure 13:
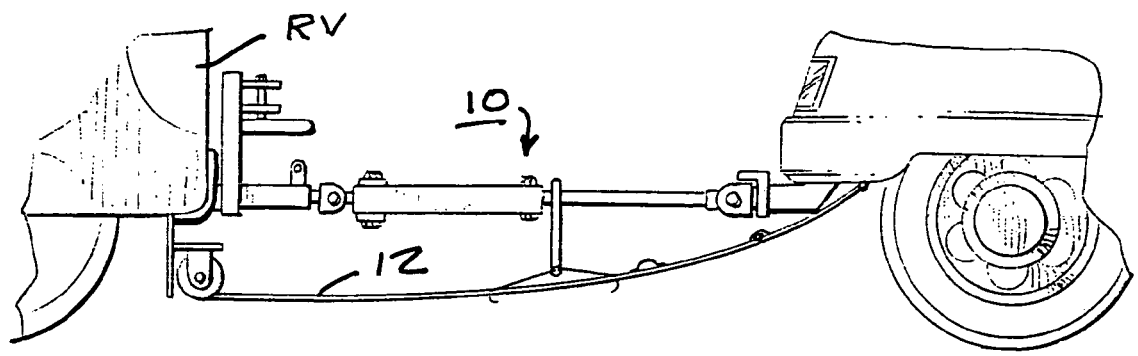
FIG. 13 is a side view showing the curtain installed between a towing vehicle and a towed vehicle such as an automobile.

Turning now to the drawings, the tow curtain device of the present invention is seen in FIGS. 1 and 2 and generally is designated by the numeral 10. The tow curtain has a panel 12 which is of a durable material such as nylon or other mesh fabric to allow air to pass through. The curtain has a rear edge 14, front edge 16 and opposite side edges 18 and 20. The side edges 18 and 20 may be slightly tapered along 18A and 20A and further provided with converging sections 18B and 20B which intersect at the rear edge 14. The edges of the fabric are finished at the seams by a sewing operation for both appearance and durability. The panel may be overlapped and sewn at 22 as seen in FIG. 4.

The rear edge 14 has a sewn-in sleeve 24 which receives an elastic cord member 26. The rear edge of the panel 12 is attached to a retractable roller 28 rotatably secured to the ends of a tubular bracket 30. Referring to FIGS. 8, 8A, 8B and 8C, the overall length of the bracket 30 and the rear edge 14 is selected to extend substantially across the rear of a towing vehicle such as an RV. The roller 28 is constructed as a retractor having pins 32 and will apply a winding force to the roller 28 to retract the curtain into the housing spring. The retractor is of the spring type used to retract awnings and roller shades and is well known to those skilled in the art. The bracket has L-shaped ends 34. The tubular bracket supports air dam 36 extending downwardly across the rear of the vehicle. The tubular bracket 30 is supported from a structural member such as an existing hitch component H on the RV by brackets 29 and 31 which are slidably adjustable at slots 33, 33A. The upper end of bracket 31 is secured by a bolt and nut 35 extending below or through the hitch H. The bolt and nut 35A secure the brackets 29, 31 once slidably adjusted to the proper length.

When not in use, the curtain panel is retracted in a rolled condition about the roller 28 in a convenient, out-of-the-way position. The rear edge of the panel 12 is attached to the roller by inserting the sleeve 24 and cord 26 into the elongate slot 27 in surface or the roller 28, which surface facilitates convenient removal of the panel if required. The air dam 36 provides a barrier preventing road debris from passing between the vehicle and the top of bracket 30.

An optional cover 29, as seen in FIG. 17, may be secured to the roller support bracket 30 by suitable fasteners. The cover 29 is a durable plastic or fiberglass and will protect the tow curtain from debris and weather conditions prolonging its life and protecting its appearance.

When it is desired to use the curtain, the towed vehicle, such as a automobile, as shown in FIGS. 1 and 2 will be secured to the towing vehicle by conventional approved towing hitch H. Once the towed vehicle is connected, the panel 12 is rearwardly extended and attached to the front of the towed vehicle. The roller 28 will apply a retracting force which will keep the panel taut. To accommodate attachment to the towed vehicle such as an automobile, the towed vehicle is provided with attachment means shown as a pair of eye bolts 40 which are permanently secured to the front of the vehicle such as on the underside of the bumper or to a secure position such as on the frame of the vehicle. These are seen in FIGS. 8 and 9. The eye bolts 40 are spaced-apart a suitable distance such as two to three feet depending upon the vehicle and the frame construction.

An attachment tube 42 is secured at or adjacent the rear edge 16 of the curtain. The attachment tube 42 includes a hollow, tubular member 44 which is received in a fabric sleeve 44 at this location. The tube 42 is secured against rotation by a fastener 46 such as a screw extending through the panel fabric into the hollow tube. The tube also acts as a stop to limit the retraction of the panel as the tube will engage the roller 28 when fully retracted.

The opposite ends of the tube 42 are each provided with detent mechanisms 50, 50A each having a spring-loaded detent pin 52. The detail of the detents are shown in FIG. 10. The detents are housed in a cap 54 inserted into the hollow interior of the opposite ends of the tube and aligned with the eye bolts 40. The detent pins 52 can then be depressed against the force of spring 55 which allows initial positioning. The pins are then released so they extend through the eye bolts 40 securing the curtain in place in a horizontal position extending from the retractor to beneath the front end of the towed vehicle. The curtain can be detached by simply depressing the pins 52 so the tube 42 can be disengaged from the eye bolts.

Figure 15:
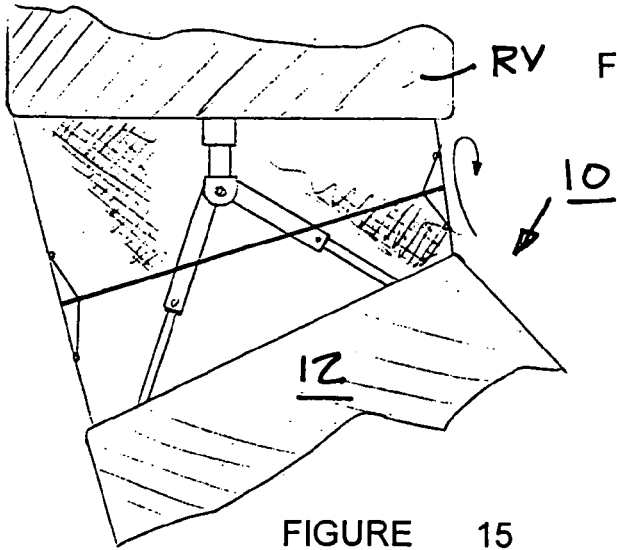
FIG. 15 is a top view showing the self-correcting retraction that occurs when the driver of the towing vehicle executes a turn.

One advantage of the tow curtain of the present system is that it is mounted on a retractor so that as the towing vehicle negotiates turns, the panel 12 will be self-adjusting as seen in FIG. 15. During the course of a turn, as one side of the towing vehicle moves closer to the towed vehicle, the retractor 28 will automatically take up any slack due to the spring force applied by the retractor. Drain grommets 60 are provided at suitable locations in the panel to allow moisture to pass through the panel to prevent moisture from accumulating on the curtain.

A rigid reinforcing member 62 also extends transversely through a sleeve 64 sewn into the curtain material. The reinforcing member extends transversely at the intersection of edges 18A and 18B and 20A and 20B.

To further stabilize the curtain during towing, particularly through turns, a turn support strut 70 is installed when traveling extending transversely along an intermediate location. The strut 70, shown in detail in FIG. 11 and consists of a hollow tube 72 having a length corresponding to the width of the curtain. The opposites ends of the tube are notched at 74 and may be secured for travel by inserting elastic bungee cords 76, 76A extending along opposite sides of the curtain into the notches. The bungee cords shown in FIG. 18 are connected by fingers 75 to reinforced grommets 78 as shown. When not in use, the tube 72 is disengaged from the elastic bungee cords and stored by inserting it into sleeve 64.

The bungee cords 76, 76a each have a centering ball 79 which seats in the ends of the tube 72 to prevent shifting.

Referring to FIGS. 2 and 5, loops 80 are provided on the panel to assist in extending the panel. The user may grip the loops and exert a manual pulling force. When the panel is extended, straps 81 may be looped about a structural member such as a hitch component and secured by loop and hook components 83 to temporarily secure the panel while the detents 50, 50A are engaged in their respectable fasteners 40. Once this is done, the straps 81 are loosened or detached.

Figure 14:
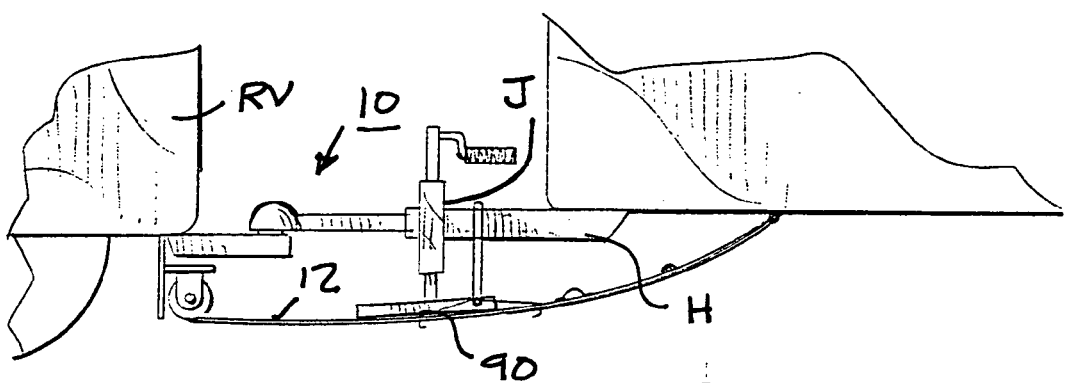
FIG. 14 is a side view showing the curtain installed between a towing vehicle and a towed vehicle such as a trailer with the bearing pan of FIG. 12 installed on the hitch screw jack.

FIG. 14 shows use of the tow curtain of the present invention in connection with a towed vehicle such as a trailer T. Trailers customarily have a hitch H with screw jack J coupled to the hitch H as seen in FIGS. 12 and 13. These type of jacks J have a base B. The jack can be operated to maintain the hitch and support it in a horizontal position. However, the existence of the jack presents an obstacle to use of the curtain. Accordingly, when towing a vehicle having an obstacle such as a jack, a bearing pan 90 is provided which is secured to the base B of the jack. The bearing pan shown in FIG. 12 has a planar base 92 and upstanding sidewall 94. The wall 94 is provided with drain passages 95. The base is secured to the underside of the jack base B and is larger than the foot of the jack so a substantial bearing surface is defined by the planar base 92 of the pan. In this way, if the tow curtain rubs or engages the underside of the pan, the large surface will reduce localized wear. The pan can be temporarily secured to the jack by any convenient means such as elastomeric bungee cord 96 having hooks on opposite ends. The hooks are engageable in the attachment holes 97 in opposite sidewalls of the pan and the cord 96 can be stretched over an existing hitch structure as seen in FIG. 12.

Figure 16:
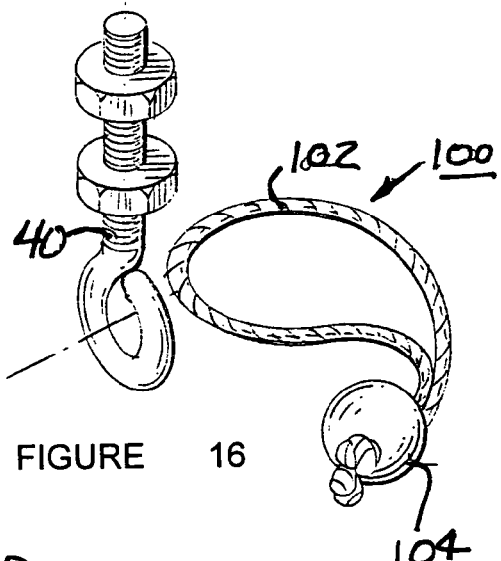
FIG. 16 shows a tie for attaching the curtain to a towed vehicle such as a trailer having an eye bolt.

Also, towed vehicles, such as trailers, can be secured to the rear of the fabric tow curtain, by permanently securing a fastener such as an eye bolt 40 to the front of the trailer at a convenient location. As seen in FIG. 16, an attachment member 100, such as a small elastic band 102, with an adjustable plastic locking ball 104 may be used to secure the rear edge of the curtain to an eye bolt secured to the front of the trailer. A reinforced grommet 106 is provided in the rear of panel 12 through which the band 102 can be extended and the band, in turn, is then secured through the eye bolt and looped over the ball 104 and tightened using the plastic ball 104.

Thus, from the foregoing, it will be seen that the present invention provides a flexible shield or curtain which is extendable to protect both the towing vehicle and the towed vehicle such as a trailer or automobile. Debris such as rocks, salt, oil and grease that are deflected rearwardly from the RV during travel will impinge on the undersurface of the curtain and be redirected downwardly preventing accumulation of grit and grime on the towing and towed vehicles and, further, preventing damage such as rock chips to the body of the vehicles. Both the rear of the towing in the front and the towed vehicle are protected, as well as the rear engine area of the towing vehicle and the front engine compartment area of the towed vehicle. Also, as mentioned above, the deflection of road debris will also substantially lessen fogging and obscuring of accessories such as rear camera lenses which are often mounted on the rear of towing vehicles.

The device is light weight, durable and self-storing. Installation and removal is quick and simple. Deployment and retraction require only an easy and quick operation.

It will be obvious to those skilled in the art to make various changes, alterations and modifications to the invention described herein. To the extent such changes, alterations and modifications do not depart from the spirit and scope of the appended claims, they are intended to be encompassed therein.

I claim:

1. A shield for a towing vehicle connectable by a hitch to a towed vehicle comprising:
   (a) a flexible panel having opposite sides and front and rear edges;
   (b) a retractor mountable to the towing vehicle, said panel being connected to said retractor and having a stored and deployed position in which the panel extends horizontally between the towing and towed vehicles substantially the width of the towing vehicle;
   (c) attachment means on said panel for coupling said panel to said towed vehicle; and
   (d) an air dam positioned to extend transversely across the rear of the towing vehicle adjacent said retractor.

2. The shield of claim 1 further including a strut detachably securable to extend transversely across said panel in a use position.

3. The shield of claim 1 wherein said attachment means comprises detent means on said panel and cooperative receiving means on said towed vehicle.

4. The shield of claim 1 wherein said panel is mesh fabric.

5. The shield of claim 2 including storage means on said panel for storing said strut when not in a use position.

6. The shield of claim 2 wherein said strut is a tube having notched ends engageable in elastic members at opposite sides of said panel.

7. The shield of claim 4 wherein said panel is sewn construction and said sides and edges are provided with finished seams.

8. The shield of claim 3 wherein said detent means comprise a tube having spring-biased pins on the opposite ends of the tube.

9. The shield of claim 1 wherein a rigid reinforcing means extends transversely of said panel.

10. The shield of claim 3 wherein said cooperative receiving means comprise an eye bolt.

11. The shield of claim 1 further including a bearing pan securable to the hitch.

12. The shield of claim 1 wherein said retractor is spring roller shade retractor.

13. The shield of claim 1 wherein said retractor is provided with detent means engageable in a bracket on said towing vehicle.

14. The shield of claim 13 wherein said bracket is supported on said hitch.

15. The shield of claim 1 further including a protective cover on said retractor.

16. The shield of claim 2 wherein said strut is attachable to the panel at elastic cords.

17. The shield of claim 16 wherein said elastic cords include centering means to prevent shifting of said strut.

18. A shield for a towing vehicle connectable by a hitch to a towed vehicle comprising:
   (a) a flexible panel having opposite sides and front and rear edges;
   (b) a retractor mountable to the towing vehicle, said panel being connected to said retractor and having a stored position and a deployed position in which the panel extends horizontally between the towing and towed vehicles;
   (c) attachment means on said panel for coupling said panel to said towed vehicle; and
   (d) a bearing pan securable to the hitch disposed below the flexible panel.

19. A shield for a towing vehicle connectable by a hitch to a towed vehicle comprising:
 (a) a flexible panel having opposite sides and front and rear edges;
 (b) a retractor mountable to a bracket on the towing vehicle, said panel being connected to said retractor and having a stored position and a deployed position, said retractor having detent means engageable with said bracket on said towing vehicle;
 (c) attachment means on said panel for coupling said panel to said towed vehicle; and
 (d) an air dam positioned on said bracket to extend transversely across the rear of the towing vehicle.

* * * * *